United States Patent Office 3,005,693
Patented Oct. 24, 1961

3,005,693
PROCESS FOR PREPARING ROCKET FUEL CONTAINING POLYMERIZED OLEFINS AND BORON
Charles L. Thomas, Swarthmore, and Chalmer G. Kirkbride, Wallingford, Pa., assignors to Sun Oil Company, Philadelphia, Pa., a corporation of New Jersey
No Drawing. Filed Oct. 29, 1957, Ser. No. 693,025
5 Claims. (Cl. 52—.5)

This invention relates to high energy fuels particularly suitable for use in jet propulsion motors.

Jet propulsion motors, commonly called rocket motors, operate by converting the thermal energy of a chemical reaction into a high velocity stream of gas which flows through a nozzle, thereby producing a thrust in the opposite direction. The components of the chemical reaction are designated the "propellants," and consist of a fuel and an oxidant. The fuel may be liquid or solid, and regardless of which is used, a propellant system which will supply the most energy in the chemical reaction from the lowest weight and volume of fuel is highly advantageous.

Liquid fuels are especially useful in long range rockets where burning for a long time is desired, but suffer the disadvantage of requiring complicated systems for injecting separate streams of the liquid fuel and oxidant into the combustion chamber; improper operation or failure of any part of the injection system results in failure of the rocket. Solid fuels are especially useful when only a short duration of thrust is needed. As generally used, a solid fuel is intimately admixed with an oxidant and the mixture is stored and burned in the combustion chamber of the rocket. This solid propellant may be cast, while in molten phase, directly into the combustion chamber so that, on ignition, burning is from one end toward the other end. Such operation has certain advantages such as in providing a continuous thrust, but suffers the disadvantage in that the propellant must be quite plastic so that it adheres to the combustion chamber sides, thereby preventing burning through gaps or fissures therein. However, when stored in a rocket motor, plastic propellants tend to flow under their own weight so that the rocket must be stored in a certain position to maintain the propellant in its proper position. A further disadvantage is that continuous burning of the grain from one end changes the center of gravity of the rocket so that accurate flight is not achieved without complicated guiding devices. To overcome these disadvantages, the propellant grain can be designed with a plane of symmetry so that uniform burning is achieved while maintaining a relatively constant center of gravity. By proper design, the grain also can be made to burn at a relatively rapid rate because of the greater surface area exposed. Such design of a propellant grain is well known, and is described, for example, in "Encyclopedia of Chemical Technology," volume 11, pages 773–778, edited by Kirk and Othmer (The Interscience Encyclopedia, Inc., 1953). In forming such a grain, the solid propellant must be rigid, rather than plastic, so that its shape is maintained during storage, and the grain must not crack or shatter under stresses such as vibrations and/or unequal pressures. The grain may be supported by complicated metal grids or the like, but such supported grains are not satisfactory in that the weight of the rocket is increased and the grids may not prevent shattering of the grain. Thus, a propellant composition has not heretofore been described which is suitable for both burning from one end toward the other end and for forming into grain having a plane of symmetry to produce more rapid burning and to maintain the center of gravity of the rocket substantially constant. Such a propellant would be highly advantageous since a rocket grain of any design could be prepared therefrom, thus eliminating the need for a multiplicity of propellant compositions heretofore required to prepare different grains.

An object of the present invention is to provide a high energy fuel especially suitable for use in jet propulsion. Another object is to provide a rocket propellant suitable for use by burning from one end to the other end and for forming into grains having a plane of symmetry. Another object is to provide a process for the preparation of solid propellants. Other objects and their achievement in accordance with the present invention will be apparent hereinafter.

It has now been found that solid compositions consisting essentially of solid polymers of normally gaseous olefins and boron provide a high energy fuel especially suitable for jet propulsion, and combining this fuel with an oxidizer provides a propellant for rocket motors which may be cast into the combustion chamber of a rocket motor or formed into grain having a plane of symmetry for use in rocket motors.

Polymers useful in forming the fuel compositions of the present invention are relatively high molecular weight polymers formed from ethylene, propylene or mixtures thereof. Small quantities, say up to about 25% by weight of other olefins, such as the butenes and butadiene, can be present and form copolymers which also give good results. The polymers useful in the present invention have molecular weights of from about 5,000 to 300,000 or more and melting points of from about 150° C. to 175° C. For convenience, the compositions of the invention are hereinafter largely described in terms of using polypropylene as the polymer.

Although polypropylene has heretofore been polymerized to relatively low molecular weight polymers by use of Friedel-Crafts catalysts, such as aluminum chloride, the polymers of propylene suitable for use in the present invention are high molecular weight solids. These polymers are prepared by contacting propylene with particles of a solid polymerization catalyst maintained as a dispersion in an inert, liquid diluent such as n-heptane or isooctane.

The solid catalyst is preferably a halide of a metal such as zirconium, chromium, vanadium, molybdenum or titanium wherein the metal is in a valence state other than its highest valence state. A lower halide of titanium such as titanium trichloride or titanium dichloride, or a mixture thereof, is preferred. The metal halide catalyst is used with an activator therefor, such as an aluminum alkyl. For example, aluminum triethyl, aluminum triisopropyl, aluminum tri-n-propyl, or aluminum triisobutyl are suitable activators and give good results. Generally a mole ratio of activator to metal halide of 1:1 to 12:1 is used. Temperatures of from about 0° C. to 200° C. are suitable. Atmospheric pressure can be used but somewhat elevated pressures are advantageous in that the polymerization reaction proceeds at a faster rate at such elevated pressures, say up to about 10,000 p.s.i.g. (pounds per square inch gauge), it being necessary, however, that the pressure be sufficient to maintain the reaction medium in the liquid phase at the temperature employed. After the polymerization reaction, a catalyst deactivant, such as water or methanol, is advantageously added and the polymer recovered by removing liquids from the polymer product. Although generally unnecessary for use in the present composition, the catalyst particles can be removed from the polyproylene by contacting with an aqueous or alcoholic solution of an inorganic acid, such as nitric acid, with vigorous agitation. Preferably such agitation provides for comminuting the polymer during the contacting with the catalyst deactivating liquid. The polymer is then repeatedly washed to remove at least a major proportion of the residual inorganic material from the polymer and is dried.

The described procedure for preparing polypropylene yields a product which is a mixture of crystalline and amorphous polypropylene. The amorphous polymer can be removed by dissolution in a hydrocarbon solvent at an elevated temperature, for example, in n-heptane, isooctane, tetrahydronaphthalene, decahydronaphthalene, or the like. The resulting crystalline polypropylene is then used in the process of the invention. However, a small amount of the amorphous polymer, say up to about 10% by weight, can be present with the crystalline polymer and good results obtained. The crystalline polypropylene will generally have a molecular weight of from about 20,000 to 30,000 and usually from about 50,000 to 250,000 a density of from about 0.92 to 0.93, a melting point of from about 162° C. to 172° C., and exhibits a crystalline structure by X-ray analysis.

Polypropylene prepared as above described is esepcially useful in preparing compositions of the present invention. Boron and an oxidant can be incorporated therewith by any suitable means. In a preferred embodiment of the invention boron is introduced into the polymerization system prior to or during the polymerization so that the product is an intimate mixture of boron and polypropylene and forms a high energy fuel. This embodiment is especially valuable in applications involving separately injecting the oxidant, which in this instance may be a liquid or gas, and the fuel, such as in the form of a fine powder, or as a slurry of fine powder in a liquid hydrocarbon, into the rocket combustion chamber. The fuel, in this embodiment, should contain at least 10% boron, and may contain 80% boron, but especially advantageous results are obtained when the quantity of boron is in the range of from 30% to 60% by weight. However, this embodiment is also useful in preparing solid propellants since it is only necessary to incorporate a solid oxidant in the fuel to prepare the final propellant composition.

Boron and an oxidant can be simultaneously incorporated into polypropylene by heating the polymer to a temperature above its melting point, and uniformly dispersing finely divided boron and finely divided oxidant therein, such as by stirring. Other means of incorporating boron and the oxidant into the polymer can be used. For example, the polymer can be dissolved in an inert solvent such as tetrahydronaphthalene, decahydronaphthalene, or the like, at an elevated temperature and solid particles of boron and the oxidizer dispersed in the solution. Polypropylene is then precipitated by cooling the solution and the solvent removed such as by evaporation to form an intimate, uniform polypropylene-boron-oxidant composition. If desired, an antisolvent such as acetone, methanol, or the like can be added to the solution to precipitate the polymer, or a combination of cooling and an anti-solvent can be used. Also, the propellant composition can be prepared by mixing finely divided boron, finely divided polypropylene, and finely divided oxidant, and forming the mixture into grain by compression molding or extrusion. In preparing the propellant compositions as above described, it is preferred that the particles of boron and of oxidant have a size of from about 1 to 1,000 microns, and preferably from about 10 to 500 microns.

The quantity of boron can be varied, but generally a quantity about equal to the quantity of polymer, on a weight basis, gives good results. The amount of oxidant to be employed should be substantially sufficient for complete combustion of the fuel, i.e., the polymer plus boron. Generally a quantity about equal to the quantity of polymer plus boron, on a weight basis, gives good results but more or less can be used. The final propellant in accordance with this embodiment of the invention, consists essentially of from 5–35% polypropylene, 5–35% boron, and 30–90% oxident. Small amounts, say up to about 5% by weight, of other materials such as combustion regulators can be present. For example, oxides of chromium, iron, titanium, and the like can be dispersed in the composition to accelerate combustion.

Oxidants which can be used are those which are normally solids, and include, for example, ammonium nitrate, potassium perchlorate, lithium perchlorate, sodium perchlorate and ammonium perchlorate, but other materials known to be useful as oxidants such as other perchlorates and chlorites, hyperchlorites, dichromates and chromates, preferably as ammonium, sodium, potassium, calcium, magnesium or aluminum salts, can be used.

The following examples illustrate embodiments of the invention, in which "parts" refers to parts by weight unless otherwise indicated.

*Example I*

Particles of titanium trichloride were introduced into a mixture of saturated aliphatic hydrocarbons consisting predominantly of octanes to form a dispersion, 1.65 parts of $TiCl_3$ being used for each 100 cc. of the hydrocarbon medium. 1.28 parts of aluminum triisobutyl were then introduced into the dispersion. Thus the molar ratio of aluminum triisobutyl to $TiCl_3$ was about 0.6:1. With the temperature of the dispersion adjusted to about 60° C., propylene was introduced into the reactor to a pressure of about 110 p.s.i.g. The polymerization was continued for 8.1 hours during which time the temperature was maintained in the range of from 55° C. to 66° C. and pressure was maintained in the range of from 100 p.s.i.g. to 120 p.s.i.g. by periodically introducing propylene into the reactor. After 8.1 hours, excess propylene was vented and methanol was introduced into the reactor to deactivate the catalyst. After washing with an alcoholic nitric acid solution to remove a substantial portion of the catalyst components, the polypropylene product was contacted with boiling n-heptane (atmospheric pressure) to remove amorphous polymers. There were recovered 152 parts of solid crystalline polypropylene having a molecular weight of 150,000.

In order to prepare a propellant, 100 parts of this polypropylene are converted to molten phase by heating to 190° C., and powdered potassium perchlorate and powdered boron (about 200 mesh; U.S. Sieve Series) are incorporated therein with stirring, 100 parts of boron and 200 parts of potassium perchlorate being used. The final composition contains 25% polypropylene, 25% boron and 50% potassium perchlorate. While still in the molten phase, the propellant is cast into the combustion chamber of a rocket motor. On cooling, the rocket may be stored in any position without flow of the propellant occuring. On ignition, a burning rate of about 0.5 inch per second is obtained, the rate being dependent upon the pressure of the gas in the combustion chamber and the original temperature of the grain. Good propulsion characteristics are obtained, which are due at least in part to the conversion of the fuel to minimum molecular weight gaseous products which are formed from the relatively large amount of hydrogen present in polypropylene.

*Example II*

A propellant composition is prepared as described in Example I, but instead of casting into a rocket motor, grain having a plane of symmetry is produced by extrusion through a suitable die, the form being known as cruciform grain. On utilizing this grain in a rocket by known methods, good propulsion is obtained, the greater surface area exposed to burning giving a greater thrust than obtained in Example I.

*Example III*

Polypropylene prepared as described in Example I is dissolved in decahydronaphthalene, 10 parts of polypropylene being dissolved in 500 parts of decahydronaphthalene at 170° C. After the polymer is dissolved, 40 parts of powdered boron and 50 parts of finely divided potassium perchlorate are dispersed in the solution. With agitation, the solution is cooled. Polypropylene precipitates intimately admixed with boron and potassium perchlorate. After drying, the composition is extruded to form grain for rocket propulsion.

*Example IV*

The procedure of Example I is repeated, using the same quantities of the same ingredients, except that prior to introducing propylene into the reactor, about 100 parts of powdered boron is dispersed in the reaction medium. Polymerization is then performed as before, and there is recovered polypropylene having boron uniformly dispersed therethrough. The recovered composition consists essentially of polypropylene having about an equal weight of boron, and a small amount of inorganic material from the catalyst components.

The composition is a high energy fuel, and may be used in propulsion motors in any manner in which high energy, solid fuels are employed, such as in the form of a slurry in liquid hydrocarbons or the like. On incorporating an oxidant into the fuel, a propellant is provided which is useful as described in the foregoing examples.

When other olefins, such as ethylene or mixtures of ethylene and propylene, are substituted for propylene, and when other oxidants are substituted for potassium perchlorate, substantially equivalent results are obtained as herein described.

The invention claimed is:

1. Process for preparing a high energy fuel composition which comprises forming a dispersion, in an inert liquid reaction medium, of finely divided boron and a solid metal halide catalyst in which the metal is selected from the group consisting of zirconium, chromium, vanadium, molybdenum and titanium together with an aluminum alkyl activator, the molar proportion of the activator to the metal halide being in the approximate range of 0.6:1 to 12:1, contacting the dispersion under polymerizing conditions with a normally gaseous olefin selected from the group consisting of ethylene, propylene and mixtures thereof to form solid polymers of molecular weight in the range of 5000–300,000, the amount of said olefin so contacted with the dispersion being sufficient to produce a reaction mixture in which the weight proportion of boron to polymer is from 10:90 to 80:20, and recovering from the reaction medium solid polymers having boron dispersed therein.

2. Process according to claim 1 wherein said metal halide is titanium trichloride.

3. Process according to claim 2 wherein said activator is aluminum triethyl.

4. Process according to claim 2 wherein said activator is aluminum triisobutyl.

5. Process according to claim 1 wherein said proportion of boron to polymer is from 30:70 to 60:40.

References Cited in the file of this patent

UNITED STATES PATENTS

| | | |
|---|---|---|
| 2,067,213 | Snelling | Jan. 12, 1937 |
| 2,410,801 | Audrieth | Nov. 12, 1946 |
| 2,541,389 | Taylor | Feb. 13, 1951 |
| 2,622,277 | Bonell et al. | Dec. 23, 1952 |
| 2,783,138 | Thomas | Feb. 26, 1957 |
| 2,796,529 | Morrison | June 18, 1957 |
| 2,855,372 | Jenkins et al. | Oct. 7, 1958 |

FOREIGN PATENTS

| | | |
|---|---|---|
| 533,362 | Belgium | May 16, 1955 |

OTHER REFERENCES

Blatz: Ind. and Eng. Chem., vol. 48, No. 4, pp. 727–8.
Chem. and Eng. News, May 27, 1957, pp. 21 and 22.
Moore et al.: Jet Propulsion, vol. 26, No. 11, November 1956, pp. 965–8.
Zaehringer: "Solid Propellant Rockets," American Rocket Co., Box 1112, Wyandotte, Mich. (1955), p. 80.
Arendale: Industrial and Eng. Chem., vol. 48, No. 4, April 1956, pp. 725–6.
"Jet Propulsion," Air Technical Service Command (1946), p. 272.